July 18, 1961 K. J. GERMESHAUSEN ET AL 2,992,874
METHOD OF ASSEMBLING DISCHARGE DEVICES
Filed Aug. 15, 1958
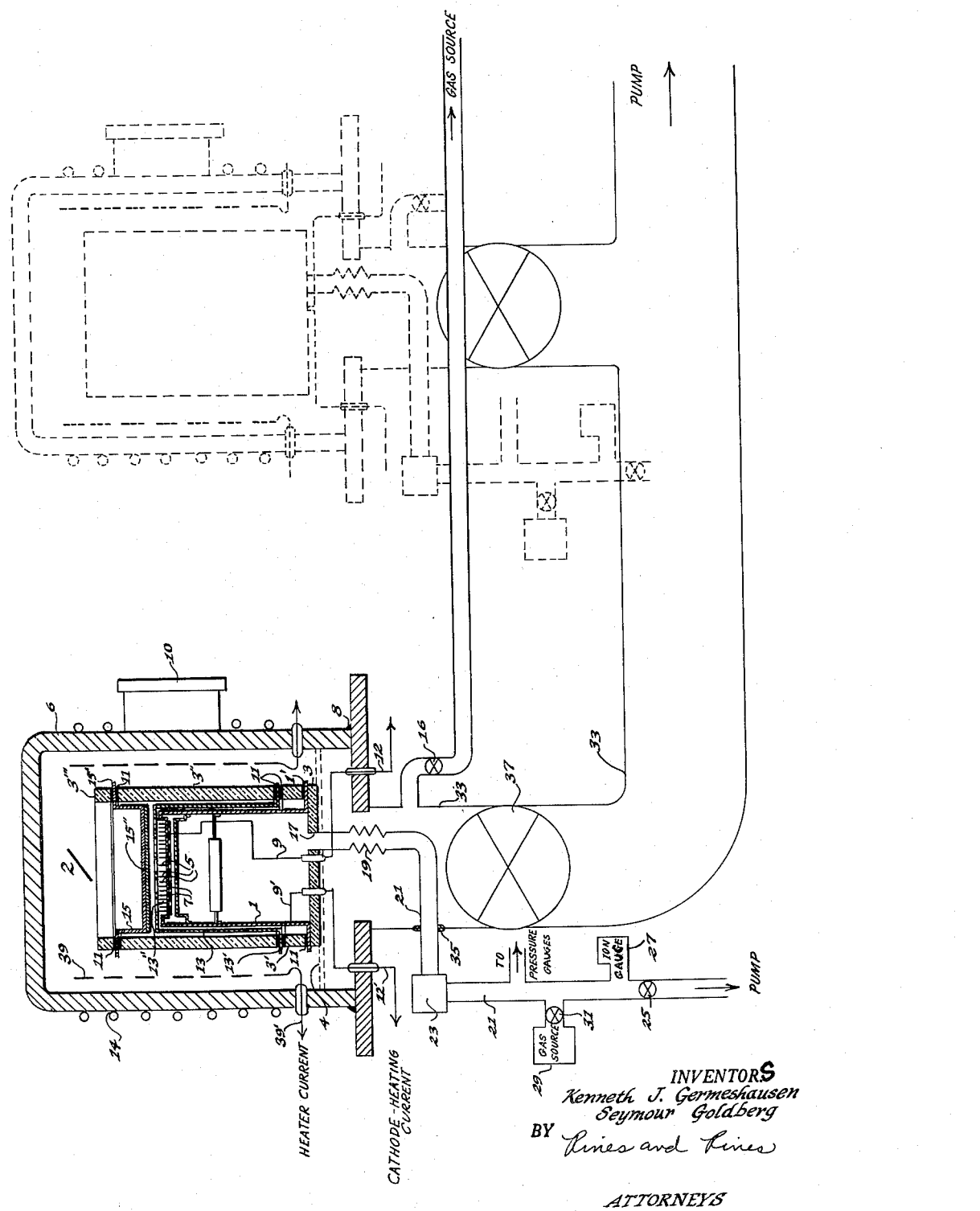
INVENTORS
Kenneth J. Germeshausen
Seymour Goldberg
BY Pines and Pines
ATTORNEYS United States Patent Office 2,992,874
Patented July 18, 1961

2,992,874
METHOD OF ASSEMBLING DISCHARGE DEVICES
Kenneth J. Germeshausen, Newton Center, and Seymour Goldberg, Lexington, Mass., assignors to Edgerton, Germeshausen and Grier, Inc., Boston, Mass., a corporation of Massachusetts
Filed Aug. 15, 1958, Ser. No. 755,264
12 Claims. (Cl. 316—19)

The invention relates to methods of and apparatus for assembling discharge devices and, in particular, to a method and apparatus for manufacturing electron-discharge and gaseous-discharge tubes having ceramic envelopes, and hereinafter referred to by the generic term "discharge device."

Heretofore known processes of manufacturing ceramic types of electron-and-gaseous-discharge tubes require a multiplicity of steps, including the movement of the tubes from one machine to another and, in some processes, to a third machine for finishing the assembly. Before the tubes are so moved from machine to machine, they often must be filled with an inert gas, such as helium, to protect the interior surfaces, and the gas-filling tubulation is then pinched off. Upon set-up at the new machine, the pinch-off is opened, usually without permitting air to enter. The inert gas must then be pumped out and the tube is subjected to the further required processing steps. All of this requires costly labor and time.

It is therefore an object of the present invention to provide a new and improved method of and apparatus for manufacturing such tubes without the necessity for these multiple-machine operations and their disadvantageous features. To the contrary, all of the assembling and finishing steps may, in accordance with the present invention, be performed at one location without moving the tube or making any adjustments of the parts thereof.

A further object is to provide a novel method and apparatus that is particularly adapted for the manufacture of ceramic-envelope discharge devices.

Other objects will be explained hereinafter and will be more particularly pointed out in connection with the appended claims. A fuller understanding of the invention may be had by referring to the accompanying drawing, the single figure of which is a longitudinal section of a preferred apparatus for practising the manufacturing method underlying the present invention.

The component parts 2 of a ceramic-type discharge device and the like, such as, for example, a hydrogen thyratron, may be stacked one on top of the other upon a support, schematically illustrated at 4, that is enclosed by a gas-tight housing, such as a bell jar 6, sealed, as is well known, at its base to a platform 8.

The components of the discharge tube 2 are stacked in the order and form desired for the finished tube. Thus, in the illustrative case of a thyratron, such as, for example, of the type described in the applicant Germeshausen's copending application, Serial No. 598,425, filed July 17, 1956, for Gaseous-Discharge Device, an inverted cylindrical cup-shaped cathode electrode 1 is disposed with its outwardly extending peripheral flange 1' resting upon a ceramic base member 3. At its upper end, the cathode 1 may contain an aperture exposing a plurality of vane-type electron-emitters 5, as of the type described in our copending application, Serial No. 580,551, filed April 25, 1956, for Electric Discharge Device and Cathode, now U.S. Letters Patent No. 2,937,301, issued on May 17, 1960. The cathode vanes 5 may be self-heated or indirectly heated as by a heater ribbon or coil 7 energized by current fed along conductors 9 and 9'.

Resting upon the upper surface of the inverted cathode-cup flange 1' is a cylindrical portion 3' of the ceramic envelope, with a brazing washer 11 as of "BT" eutectic solder and the like, interposed. A similar washer 11 is interposed along the top peripheral edge of the portion 3' upon which the bottom or lower surface of the flange 13' of an inverted cup-shaped control-grid electrode 13 may rest. The main cylindrical body portion 3" of the envelope rests upon the upper surface of the control-grid flange 13' with a brazing washer 11 interposed. The upper planar surface of the control-grid cylinder 13 is apertured at 13" to permit the passage of current from the cathode vanes 5 to the bottom substantially parallel planar surface 15" of an up-right cup-shaped anode electrode 15. The lower surface of the anode flange 15' rests upon a brazing washer 11 disposed upon the upper peripheral edge of the body portion 3" of the ceramic or other envelope. Upon the upper surface of the anode flange 15', with a brazing washer 11 interposed, is a further cylindrical envelope portion 3''' that serves as a backing ring to give strength to the later-formed seal of the flange 15' to the envelope wall.

The components 1, 13, 15, 3—3'—3"—3''' etc. of the discharge device 2 are thus stacked in the form of the finished tube, and they may be maintained in such position either under the influence of gravity alone or with the aid of a clamp between the members 3 and 3''', not shown.

In accordance with the present invention, the gas-filling tubulation 17 of the discharge device 2 is connected through the support 4 preferably by a bellows-type joint 19 to an auxiliary pump line 21 that connects through a cold trap 23 and a valve 25 to an evacuation pump, labelled "Pump." The use of the bellows joint 19 obviates the necessity for precise cutting of the length of the tubulation 17 or precise adjustment of the height of the cathode-mount assembly supporting members. Pressure gauges and an ion gauge 27 may also be associated with the auxiliary pump line 21, as may an independent source 29 of the gaseous medium that is ultimately to fill the completed device 2 under the selective control of a valve 31.

A main evacuation pump line 33 communicates through the platform 8 with the sealed housing 6. Though a part of the auxiliary pump line 19—21 from the discharge device 2 passes through and out of a sealed aperture 35 in the main pump line 33, the lines 19—21 and 33 are separate and do not communicate with one another; the main line 33 evacuating the housing 6 when the main-line valve 37 is open to permit communication with an evacuation pump, and the auxiliary line 19—21 separately evacuating the discharge device 2.

Disposed within the bell housing 6 is a heater coil preferably comprising a tantalum ribbon winding 39 or the like that has lead connections 39' communicating with a source of heater current external to the housing 6. With the heater 39 energized, the main and the auxiliary pump lines 33 and 19—22 are evacuated to the desired degree of vacuum. The heater 39 will elevate the temperature of the components of the discharge device 2 and thus bake out the tube components and braze them together as a finished sealed tube unit.

Brazing will be completed when the "BT" washers 11 between the body portions of the envelope and the grid and anode cup assemblies melt, as may be observed through a window 10 in the bell-jar housing 6. At the desired vacuum level, furthermore, cathode out-gassing can be accomplished with the vacuum pump still working, by applying cathode-heater current to external conductors 12 and 12' communicating with the cathode-heater leads 9 and 9' within the tube 2. The power to the bell-jar heating coil 39 may then be disconnected and cooling water may be run through the cooling coils 14 external to the bell-jar housing 6 in order to hasten cooling of the tube 2 after brazing.

Following the brazing, the main pump-line valve 37 may be closed and gas may be admitted into the bell-jar housing 6 from an external source communicating by the further valve 16 with the main pump line 33. Any leaks in the brazed tube 2 will pass such gas into the tube 2 and will be detected in the auxiliary-line ion gauge 27. After the leak-detection test, the pressure in the housing 6 may be raised to atmospheric, and the bell-jar housing may be removed. Power connections can then be made at the anode and cathode flanges 15' and 1' and the remaining processing can be completed without moving the tube 2 from the support 4. Operation of the valve 31 will permit the desired gaseous medium to be introduced from a source 29 along the auxiliary line 21—19 into the tube 2 in the case of a gaseous-discharge tube. The tubulation 17 will, on the other hand, be sealed off at a desired degree of vacuum in the case of an electron-discharge device.

In accordance with this invention, therefore, final assembly, final exhaust and bake-out are thus all accomplished during brazing. Without moving the tube, leak detection is accomplished. Further cathode break-down, aging, and electrical testing can all additionally be accomplished without moving the tube. The tube evacuation, moreover, is a step that may be accomplished at the same time as the bell-jar evacuation and the vacuum lines thereto are separately and selectively controllable.

A multiplicity of tubes may be simultaneously assembled by paralleling apparatus of the type described with the main pump line 33, as indicated by the dotted further unit. Alternatively, a plurality of tubes 2 may be stacked within a larger housing 6.

Further modifications will also occur to those skilled in the art and all such are considered to fall within the spirit and scope of the invention as defined in the appended claims.

What is claimed is:

1. A method of assembling the components of a discharge device including envelope walls and a plurality of electrodes, that comprises, stacking the components in the order and form desired for the finished discharge device, enclosing the stacked components within a gas-tight housing, evacuating the housing, during the evacuation raising the temperature of the components to braze the same together, and evacuating the brazed-together device separately from the evacuation of the housing.

2. A method of assembling the components of a discharge device including envelope walls and a plurality of electrodes, that comprises, stacking the components in the order and form desired for the finished discharge device, enclosing the stacked components within a gas-tight housing, evacuating the housing, during the evacuation raising the temperature of the components to braze the same together, applying electric current for heating one of the electrodes, and evacuating the brazed-together device separately from the evacuation of the housing.

3. A method of assembling the components of a discharge device including envelope walls and a plurality of electrodes, that comprises, stacking the components in the order and form desired for the finished discharge device, enclosing the stacked components within a gas-tight housing, evacuating the housing, during the evacuation raising the temperature of components to braze the same together, evacuating the brazed-together device along an auxiliary path separate from the main path of evacuation of the housing, stopping the evacuation of the housing and introducing gas therein along the said main path, and detecting the presence of any gas leaking into the auxiliary path through the brazed-together discharge device.

4. A method as claimed in claim 3 and in which electric current is applied for heating one of the electrodes, and the housing is raised to atmospheric pressure and is then removed from the discharge device.

5. A method of assembling substantially cylindrical components of a discharge device including insulating cylindrical envelope portions, a plurality of cup-shaped electrodes each having an annular flange along the free edge of its periphery, and a plurality of annular brazing washers, that comprises, stacking the components with one of the cup-shaped electrodes disposed in inverted position at the bottom, with one of the cylindrical envelope portions disposed to rest with its bottom peripheral edge upon the flange of the said one electrode, with another of the cup-shaped electrodes disposed in up-right position at the top with the bottom surface of the flange resting upon the top peripheral edge of one of the cylindrical envelope portions, and with the brazing washers interposed between the said flanges and the adjacent peripheral edges of the envelope portions; enclosing the stacked components within a gas-tight housing; evacuating the housing; during the evacuation raising the temperature of the components to braze the same together; and evacuating the brazed-together device separately from the evacuation of the housing.

6. A method of assembling substantially cylindrical components of a discharge device including insulating cylindrical envelope portions, a plurality of cup-shaped electrodes each having an annular flange along the free edge of its periphery, and a plurality of annular brazing washers, that comprises stacking the components with one of the cup-shaped electrodes disposed in inverted position at the bottom, with one of the cylindrical envelope portions disposed to rest with its bottom peripheral edge upon the flange of the said one electrode, with another of the cup-shaped electrodes disposed in up-right position at the top with the bottom surface of its flange resting upon the top peripheral edge of one of the cylindrical envelope portions, and with the brazing washers interposed between the said flanges and the adjacent peripheral edges of the envelope portions; enclosing the stacked components within a gas-tight housing; evacuating the housing; during the evacuation raising the temperature of the components to braze the same together; and evacuating the brazed-together device along an auxiliary path separate from the main path of evacuation of the housing, stopping the evacuation of the housing and introducing gas therein along the said main path, and detecting the presence of any gas leaking into the auxiliary path through the brazed-together discharge device.

7. A method as claimed in claim 6 and in which electric current is applied for heating the said one electrode, and the housing is raised to atmospheric pressure and is then removed from the discharge device.

8. A method of assembling substantially cylindrical components of a discharge device including a plurality of insulating cylindrical envelope portions, anode, cathode and control-grid cup-shaped electrodes each having an annular flange along the free edge of its periphery, and a plurality of annular brazing washers, that comprises, stacking the components with the cathode electrode disposed in inverted position at the bottom, with one of the cylindrical envelope portions disposed to rest with its bottom peripheral edge upon the flange of the cathode electrode, with the control-grid electrode disposed in inverted position with the lower surface of its flange resting upon the top peripheral edge of the said one envelope portion, with another envelope portion disposed with its bottom peripheral edge resting upon the upper surface of the flange of the control-grid electrode, with the anode electrode disposed in up-right position with the bottom surface of its flange resting upon the upper peripheral edge of the said another envelope portion, with a further envelope portion resting upon the upper surface of the anode-electrode flange, and with the brazing washers interposed between the peripheral edges of the envelope portions and the adjacent electrode flanges; enclosing the stacked components within a gas-tight housing; evacuating the housing; during the evacuation raising the temperature of the components to braze the same together; and evacuating the brazed-together device separately from the evacuation of the housing.

9. A method as claimed in claim 8 and in which the evacuation of the brazed-together device is effected along an auxiliary path separate from the main path of evacuation of the housing, the evacuation along the main path is stopped and gas is introduced into the housing through the main path, and the presence of any gas leaking into the discharge device is detected in the auxiliary path.

10. A method as claimed in claim 9 and in which electric current is applied for heating the cathode electrode, and the housing is raised to atmospheric pressure and is then removed from the discharge device.

11. A method as claimed in claim 9 and in which the discharge device is thereafter filled with its desired gaseous medium along the said auxiliary path.

12. A method as claimed in claim 3 and in which the discharge device is thereafter filled with its desired gaseous medium along the said auxiliary path.

References Cited in the file of this patent

UNITED STATES PATENTS

| | | |
|---|---|---|
| 2,731,578 | McCullough | June 17, 1956 |
| 2,780,043 | Hensgen | Feb. 5, 1957 |
| 2,792,271 | Beggs | May 14, 1957 |
| 2,792,272 | Beggs | May 14, 1957 |
| 2,837,396 | Warren | June 3, 1958 |